United States Patent [19]

Petit et al.

[11] Patent Number: 5,780,523

[45] Date of Patent: Jul. 14, 1998

[54] FOAMED PRESSURE SENSITIVE TAPES

[75] Inventors: Dominique Petit, Housse; Michel Ladang, Herve, both of Belgium

[73] Assignee: Norton Performance Plastics Corporation, Wayne, N.J.

[21] Appl. No.: 877,060

[22] Filed: Jun. 17, 1997

Related U.S. Application Data

[63] Continuation of Ser. No. 356,100, Dec. 15, 1994, abandoned.

[51] Int. Cl.[6] ..................................................... C08L 75/00
[52] U.S. Cl. ........................... 521/137; 521/138; 521/139; 521/155; 521/905; 525/127; 525/183; 525/184; 525/185; 525/418; 525/420; 525/453
[58] Field of Search ........................... 521/137, 138, 521/139, 155, 905; 525/127, 183, 184, 185, 418, 420, 453; 528/905

[56] References Cited

U.S. PATENT DOCUMENTS

| | | | |
|---|---|---|---|
| 3,615,972 | 10/1971 | Morehouse, Jr. et al. | 156/79 |
| 4,223,067 | 9/1980 | Levens | 428/308 |
| 4,430,479 | 2/1984 | Merton et al. | 525/127 |
| 4,483,889 | 11/1984 | Andersson | 427/389.9 |
| 4,731,066 | 3/1988 | Korpman | 604/366 |
| 4,855,169 | 8/1989 | McGlothlin et al. | 428/35.2 |
| 4,855,170 | 8/1989 | Darvell et al. | 428/40 |
| 5,024,880 | 6/1991 | Veasley et al. | 428/317.5 |
| 5,180,635 | 1/1993 | Plamthottam et al. | 428/345 |
| 5,272,208 | 12/1993 | Shiraki et al. | 525/92 |
| 5,342,858 | 8/1994 | Litcholt et al. | 521/98 |

FOREIGN PATENT DOCUMENTS

| | | | |
|---|---|---|---|
| 84220 | 7/1983 | European Pat. Off. | C09J 7/00 |
| 349216 | 1/1990 | European Pat. Off. | C09J 7/02 |
| 2237945 | 7/1974 | France | C09J 3/16 |
| 57137375 | 8/1982 | Japan | C09J 7/02 |
| 59155479 | 9/1984 | Japan | C08K 5/00 |
| 63-202680 | 8/1988 | Japan | C09J 3/14 |
| 1313581 | 12/1989 | Japan | C09J 7/02 |
| 7070520A | 3/1995 | Japan | C09J 7/00 |
| 2250513 | 6/1992 | United Kingdom | C09J 7/00 |
| 95/25774 | 9/1995 | WIPO | C09J 5/08 |

OTHER PUBLICATIONS

120: 325387W Peelable pressure–sensitive ashesives, Chemical Abstracts vol. 120,1994, p. 86.

*Primary Examiner*—Duc Truong
*Attorney, Agent, or Firm*—Mary E. Porter

[57] ABSTRACT

The present invention relates to a pressure sensitive adhesive foam with a percentage of theoretical density less than 90 wherein the foam has an intrinsic adhesion of greater than about 1 N/cm and a compression set under constant deflection of less than about 60%. The present invention further includes a pressure sensitive adhesive foam comprising a thermoplastic block copolymer; a tackifying resin; an isocyanate terminated monomer or oligomer; a polymer comprising a backbone of selected from the group consisting of polybutadiene, polyester and polyether, wherein the polymer contains at least 2 active hydrogens capable of reacting with the isocyanate terminated monomer; and expandable particulate materials. The invention finally further comprises a method of forming the above film.

17 Claims, No Drawings

FOAMED PRESSURE SENSITIVE TAPES

This application is a continuation of application No. 08/356,100, filed Dec. 15, 1994, now abandoned.

BACKGROUND OF THE INVENTION

1. Field of the Invention

The invention relates to pressure sensitive adhesive foams and in particular to pressure sensitive adhesive foams which are easily compressed and conform to irregular surfaces. The invention further relates to a method of processing these pressure sensitive adhesive foams.

2. Technology Review

Pressure sensitive adhesives (PSA) that can be extruded are well known. Examples of pressure sensitive adhesives include rubbers mixed with the proper tackifying resins, cured acrylics, and interpenetrating polymer networks containing blocked copolymers in a polyurethane network.

These pressure sensitive adhesives (PSA) all suffer from the common limitation of being relatively hard to compress. The pressure sensitive adhesives therefore do not conform easily to irregular surfaces, a property that is vital to ensure 100% wetting and therefore good adhesion.

Generally, a limitation such as this could be overcome by making a composition cellular or foamed. Foams are pliable, conform easily to irregular surfaces and can be produced by either physical (e.g., frothing with nitrogen before the polymeric mass sets) or chemical (incorporation of a porophoric agent such as azodicarbonamide which undergoes a chemical decomposition under heat to produce gaseous bubbles) means. Pressure sensitive adhesive foams produced by either of the above techniques, however, suffer from another limitation. Because of their inherent tack, these pressure sensitive adhesive foams when compressed tend to irreversibly deform due to adherence between opposite sides of the cells in the cellular structure.

Presently, because of this limitation adhesive foams are produced by coating non-adhesive foam substrates with thin layers of pressure sensitive adhesives. These products both conform to irregular surfaces and are pressure sensitive thereby overcoming the limitations of solid pressure sensitive adhesive extrusions and pressure sensitive adhesive foams. These products are, however, relatively complicated to produce and cannot be used for extruded profiles.

An object of this invention is to produce inherently adhesive foam product which reversibly deforms upon compression. A further object of this invention is to develop a process for producing the above inherently adhesive foamed product.

SUMMARY OF THE INVENTION

The present invention relates to a pressure sensitive adhesive foam with a percentage of theoretical density less than 90 wherein the foam has an intrinsic adhesion of greater than about 1 N/cm and a compression set under constant deflection of less than about 60 percent. The present invention further includes a pressure sensitive adhesive foam comprising a thermoplastic block copolymer; a tackifying resin; an isocyanate; a polymer comprising a backbone of selected from the group consisting of polybutadiene, polyester and polyether, wherein the polymer contains at least 2 active hydrogens capable of reacting with the isocyanate; and expandable particulate materials. The invention finally further comprises a method of forming the above foam.

DETAILED DESCRIPTION OF THE INVENTION

The present invention relates to a pressure sensitive adhesive foam having a density that is less than 90% of the theoretical density, wherein the foam has an intrinsic adhesion of greater than about 1 N/cm and a compression set under constant deflection of less than about 60 percent.

The foam has a percentage of theoretical density less than 90, preferably less than about 70 percent, more preferably less than about 50 percent, and most preferably less than about 40 percent. The material from which the foam is made has a density that is the "theoretical density". The foam formed from this material has a reduced density and the extent of the reduction is indicated by the percentage of the theoretical density represented by the density of the blown foam material.

The foam has an intrinsic adhesion of greater than about 1 N/cm, preferably greater than about 5, more preferably greater than about 10, and most preferably greater than about 20 N/cm.

The meaning of compression set for purposes of this specification is compression set under constant deflection which is the recovery of a foam after a constant deflection. ASTM Standard D 1667–76, paragraphs 21 to 25, which are incorporated herein by reference describes the test method for determining compression set with the following modification. Instead of the test specimen being compressed 25% of its original thickness, the specimen is compressed to 50% of its original thickness.

The foam has a compression set of less than about 60 percent, preferably less than about 40 percent, more preferably less than about 20 percent, and most preferably less than about 10 percent.

The foam is produced by first mixing a pressure sensitive adhesive composition with expandable particulate materials. The mixture is either coated onto a substrate or formed to shape. The viscosity of the mixture is adjusted depending on whether the mixture is used for coating or being formed into a shape. The mixture can either be heated just prior to, during or after coating or forming to a temperature at which substantially all of the expandable particulate material expands. The foam can subsequently be cured if necessary.

The pressure sensitive adhesives which may be used include adhesives which are compounded to be pressure sensitive by blending an elastomer with tackifying resins, plasticizers and other ingredients, and adhesives which consist of polymers that are inherently pressure sensitive and require little or no compounding. Examples of elastomers which are blended with tackifying resins include natural rubber; and block copolymer adhesives such as for example polystyrene-polybutadiene-polystyrene (SBS), polystyrene-polyisoprene-polystyrene (SIS), polystyrene-poly(ethylene/butylene)-polystyrene (S-EB-S), and polystyrene-poly(ethylene/propylene)-polystyrene (S-EP-S). Examples of inherently adhesive polymers which can be use with or without tackifiers to create foams include acrylics; butyl rubber; polyisobutylene; and silicones.

In forming an elastomer based pressure sensitive foam, the elastomer or rubbery polymer provides the elastic component while a low molecular weight tackifying resin constitutes the viscous component. Therefore for these elastomer systems, it is the tackifying resin which ultimately determines the visco-elastic behavior and the final properties of the finished adhesive. Further, tackifier resins can also be used in inherently adhesive polymers to increase the adhesion. Examples of tackifying resins which can be used include rosins and rosin derivatives; and hydrocarbon tackifier resins which further include aromatic, aliphatic, mixed aliphatic/aromatic, heat-reactive, terpene resins and modified or special resins.

Additives can be added to vary the properties and aging of the pressure sensitive adhesive foam. Examples of additives which can be used include antiblocking agents, antioxidants, antistatic agents, biocides, colorants, couplings agents, curing agents, flame retardants, heat stabilizers, low profile additives, lubricants, mold-release agents, odorants, plasticizers, slip agents, ultraviolet stabilizers, urethane catalysts, viscosity control agents and combinations thereof.

The expandable particulate material useful in the present invention can be swellable or non-swellable in aqueous or organic liquid, and preferably is insoluble in water or organic liquids. The expandable particulate comprises a polymeric shell having a central core comprised of a fluid, preferably liquid, material. A further requirement is that the overall dimensions of the expandable particulate increase upon heating at a specific temperature.

Expandable particulates include those materials comprised of a polymeric shell and a core of at least one other material, either liquid or gaseous, most preferably a liquid at room temperature. A liquid core is advantageous because the degree of expansion is directly related to the volume of change of the core material at the expansion temperature. For a gaseous core material, the volume of expansion expected can be approximated from the general gas laws. However, expandable particulates comprising liquid core material offer the opportunity to provide much larger volume changes, especially in those cases where a phase change takes place, i.e., the liquid volatilizes at or near the expansion temperature. Gaseous core materials include air and nonreactive gases, and liquid core materials include organic or inorganic liquids. The expansion function can also be supplemented by the addition of other conventional blowing agents.

The preferred expandable particulate materials have shells surrounding a fluid material. Examples of shell materials include copolymers of vinyl chloride and vinylidene chloride, copolymers of vinyl chloride and acrylonitrile, copolymers of vinylidene chloride and acrylonitrile, and copolymers of styrene and acrylonitrile. Further can be mentioned copolymers of methyl methacrylate containing up to about 20 percent by weight of styrene, copolymers of methyl methacrylate and up to about 50 percent by weight of ethyl methacrylate, and copolymers of methyl methacrylate and up to about 70 percent by weight of orthochlorostyrene.

The unexpanded microspheres contain fluid, preferably volatile liquid, i.e., a blowing agent, which is conventional for these expandable particles. Preferably, the blowing agent is 5 to 30 percent by weight of the expanded particle. The microspheres can be added in different manners, as dried particles, wet cakes, or in a suspension. The microspheres can also be added in a pre-expanded form.

The unexpanded particulates preferably are in the size range of from about 1 to about 100 um, more preferably from about 2 to about 30 um, and most preferably from 2 to about 10 um. After expansion, the volume of expandable particulate increases by a factor of at least 2, preferably by a factor of at least 3, and most preferably by a factor of at least 4, and may even be is high as a factor of about 10.

An example of an expandable particulate material is Expancel™ polymeric microspheres (Nobel Industries, Sundsvall, Sweden) which expand from an approximate diameter of 10 um in the unexpanded form to an approximate diameter of 40 um after expansion. The corresponding volume increase is $$V_f/V_i=(r_f/r_i)^3=4^3$$

or 64 fold, where $V_f$ and $r_f$ are the final volume and radius of the expandable particulate, respectively, after expansion, and $V_i$ and $r_i$ are the corresponding initial values for the unexpanded particulate.

The expandable particulate is normally obtained by suspension polymerization. A general description of some of the techniques that can be employed and a detailed description of various compositions that are useful as expandable particulates can be found in U.S. Pat. No. 3,615,972. A further description of compositions useful as expandable particulate can be found in U.S. Pat. No. 4,483,889. Both patents are herein incorporated by reference.

Examples of commercially available expandable particulate materials useful in the present invention include those made of poly(vinylidene chloride-co-acrylonitrile) such as Expancel™ 820, Expancel™ 642, Expancel™ 551, Expancel™ 461, and Expancel™ 051 expandable particulate. Other commercially available materials having similar constructions are available. For example, one comprising a shell of methacrylonitrile-acrylonitrile copolymer, available as Micropearl™ F-80K microbubbles (Matsumoto Yushi-Seiyaku Co., Ltd., Japan) are also useful as expandable particulate materials in the present invention.

A wide variety of blowing or raising agents may be incorporated within the foaming process of the present invention. These agents can be volatile fluid forming agents such as aliphatic hydrocarbons including ethane, ethylene, propane, propene, butene, isobutene, butane and isomers, cyclobutane, pentane and isomers, cyclopentane, hexane and isomers, cyclohexane, neopentane, acetylene, heptane, or mixtures thereof or other such aliphatic hydrocarbons having a molecular weight of at least 26 and a boiling point below the range of the softening point of the shell.

Other suitable blowing agents are halocarbons such as perfluorobutanes, perfluoropentanes, perfluorohexanes, fluorotrichloromethane, dichlorodifluoromethane, chlorotrifluoromethane, trichlorotrifluoroethane, heptafluorochlorocyclobutane, hexafluorodichlorocyclobutane, and hydrohalocarbons such as $CHF_3$, $CHClF_2$, $CH_3CHF_2$, and tetralkyl silanes such as tetramethyl silane, trimethylethyl silane, trimethylisopropyl silane, and trimethyl-n-propyl silane all of which are commercially available.

The shape of the expandable particulate material is preferably spherical but is not restricted to being spherical, i.e., it may be irregular. Other shapes can easily be envisioned such as urnlike as described in U.S. Pat. No. 3,615,972. The shape and orientation of the expandable particulate in the pressure sensitive adhesive help to determine the anisotropy of the expansion step. Where essentially spherical expandable particles are used, heating leads to isotropic expansion of the article, i.e., there is no preferred direction of expansion and all three axes expand uniformly so that the overall shape of the article does not change, only its size. Other physical constraints that may have been imposed on the article prior to expansion may lead to less than perfect isotropic expansion where essentially spherical expandable particles are used.

As a result of the expansion of the expandable particulate material, the volume of the pressure sensitive material increases. The percent volume increase is dependent on a number of factors including factors such as the amount of expandable particulate material in the article and the molecular weight of the polymeric shell of the particles. The decrease in density of the article is inversely proportional to the volume and porosity increase in the article.

The preferred embodiment of the present invention is a pressure sensitive adhesive foam comprising a thermoplastic block copolymer; a tackifying resin; an isocyanate; a polymer comprising a backbone of selected from the group consisting of polybutadiene, polyester and polyether, wherein the polymer contains at least 2 active hydrogens capable of reacting with the isocyanate; and expandable particulate materials.

The thermoplastic block copolymer or elastomers are preferably non-reactive with all other components in the composition. Examples of suitable copolymers include: styrene-isoprene-styrene block copolymers, styrene-butadiene-styrene block copolymers, ethylene-propylene rubbers, polyethylene-acrylate, styrene-butadiene, styrene-isoprene, styrene-thylene-butylene-styrene, ethylene-propylene-diene terpolymer rubbers, and ethylene vinyl acetate. The thermoplastic block copolymer preferably comprises from about 5 to about 80 percent by weight of the total composition of the pressure sensitive adhesive foam comprising components, (that is all components except the expandable particulate materials), more preferably from about 10 to about 50 percent by weight, and most preferably from about 10 to about 35 percent by weight.

The tackifying resin preferably comprises from about 15 to about 80 percent by weight of the total composition of the pressure sensitive adhesive foam, more preferably from about 25 to about 70 percent by weight, and most preferably from about 30 to about 60 percent by weight. Examples of types of tackifier resins which can be used include rosin and rosin derivatives, aromatic hydrocarbon resins, aliphatic hydrocarbon resins, mixed aliphatic/aromatic resins and terpene resins. The tackifier is preferably a hydrocarbon resin. Examples of hydrocarbon tackifier resins include glycerine rosin ester, hydrogenated pentaerythritol ester, hydrogenated glycerine ester, modified tall oil rosin, polymerized rosin and rosin ester.

The active-hydrogen containing polymer comprises a backbone selected from the group consisting of diene polymers and copolymers, polyesters, olefin polymers and copolymers, acrylate copolymers, polyethers and mixtures thereof, and contains at least 2 active hydrogens capable of reacting with the isocyanate terminated monomer. The polymer preferably comprises from about 5 to about 70 percent by weight of the total composition of the pressure sensitive adhesive foam, more preferably from about 5 to about 50 percent by weight, and most preferably from about 10 to about 25 percent by weight. Examples of these polymers include polyester diols such as Dynacoll® manufactured by Hüls; Lupranols® manufactured by BASF; polybutadienediols such as PolyBD® manufactured by Atochem; polyetheramines such as Jeffamine® manufactured by Texeco; hydroxyl grafted ethylene vinyl acetates such as Evathane® manufactured by Atochem; poly-ϵ-caprolactones such as Capa® manufactured by Solvay; and mixtures thereof.

The isocyanate component can be any one of those typically used in such formulations including tetramethylene diisocyanate, (TMDI); isophorone diisocyanate, (IPDI); methylene diisocyanate, (MDI); toluene diisocyanate, (TDI); polyphenyl polymethyl polyisocyanate, (PPPI); p-diphenyl methane diisocyanate; and the like. The preferred isocyanate is TMDI. The isocyanate is added in amounts to give a ratio of isocyanate groups to active hydrogen-containing groups of from about 0.25 to about 1.75 more preferably from about 0.5 to about 1.5 and most preferably from about 0.75 to 1.25. It is also possible to use components that yield isocyanates under reaction conditions. This includes the so-called "blocked" isocyanates in which the isocyanate group is reacted with a blocking compound such as a phenol or a phenol derivative that protects the isocyanate group from reaction with air or water under ambient conditions but which is stripped off under reaction conditions.

The expandable particulate materials preferably comprise from about 0.5 to about 30 percent by weight of the total composition of the pressure sensitive adhesive foam, more preferably from about 2 to about 20 percent by weight, and most preferably from about 5 to about 15 percent by weight.

In order that persons in the art may better understand the practice of the present invention, the following Examples are provided by way of illustration, and not by way of limitation. Additional background information known in the art may be found in the references and patents cited herein, which are hereby incorporated by reference.

EXAMPLES

Example 1

This example is a comparison between non-adhesive foams which are coated with a pressure sensitive adhesive and a intrinsically pressure sensitive adhesive foam.

Preparation of Masterbatch of the Pressure-Sensitive Foam

The masterbatch is made in a Z-blade mixer provided with two counter rotating Z shaped blades that are able to thoroughly mix even viscous elastomers with one another. The mixing space is steam jacketed, and the temperature of the materials mixed can be controlled between 80° and 160° C., by regulating the steam pressure in the mixer jacket.

The temperature in the mixer is held at about 150° C. and the different components are introduced in the following order and weight proportions:

SBS Rubber (Vector 4111), 100 parts

Tackifying Resin (Regalite R101), 200 parts $CaCo_3$(Setacarb OG), 9 parts

Parafinic Oil (Enerpar 10), 30 parts

Polyetherdiol (Lupranol 2001), 75 parts

Catalyst (Texacat T30), 5 parts

Plastic Spheres (Expancel DU091), 33 parts

Before introducing the Expancell microspheres, the temperature is lowered to 100° C. After completion of the mixing, the composition is unloaded while hot enough to flow easily, on to thick siliconized paper.

Production of the Foam

Mixing the masterbatch with 8 parts by weight of Vestanat TMDI (the isocyanate) is accomplished using a Brabender type machine, with two counter-rotating arms. The mixing is realized in the narrow space between the arms and the walls of the mixer. A typical amount to mixed was 50 g. Working temperature was 100° C., and speed of the arms 50 RPM. Mixing time is about 1 minute. The mixed product is collected on a siliconized Mylar (PET) film. Another sheet of that film is laid on top of the product, and a film is shaped under a press at 100° C. Thickness of the film is 0.3 mm. This film is then cured and foamed in an oven at 150° C. keeping the Mylar on both sides.

The foam according to the invention thus produced was compared with a commercial PUR foam laminated on both sides with a pressure sensitive adhesive and sold by Norton Plastics Products Corp. under the registered trademark "Normount V-2830". This is identified in the Tables below as "C-2". The product according to the invention is also compared with a product, identified as "C-1", which is a 140 kg/m³ polyethylene foam coated with an acrylic PSA.

| PSA Foam Properties/Measured by | C-1 | C-2 | Invent. |
|---|---|---|---|
| Density (Kg/m³) ASTM D1667-76 | 305 | 600 | 400 |
| Peel Adhesion (N/cm) ASTM D903 | 9 | 12 | >22 |
| Shear Adhesion (N/cm²) ASTM D1002 | 80 | 80 | 110 |
| Tensile Adhesion (N/cm²) ASTM D897 | 75 | 65 | 120 |
| Elongation at break (%) ISO 1926 | 210 | 220 | 185 |
| Tensile Strength (N/cm²) ISO 1926 | 230 | 110 | 95 |

For the shear tests the method was modified by changing the speed from 1.3 mm/min to 10 mm/min. The samples were conditioned at room temperature for 24 hours before testing. Adhesion tests were made on stainless steel except that tensile adhesion was between aluminum T-blocks. Also in the tensile adhesion test the sample was 25.4 mm×25.4 mm square and the speed of testing was 300 mm/min. No dwell time was provided. Measurement of all the above parameters was carried out on a tensile Instron Type 1122 machine.

| Adhesion . . . Diff. Substrates (N/cm) | C-1 | C-2 | Invent. |
|---|---|---|---|
| Stainless Steel | 9 | 12 | >22 |
| Glass | — | 14 | >22 |
| Polypropylene | — | 3 | 12 |

| Adhesion after aging (N/cm) | C-2 | Invent. |
|---|---|---|
| -after 10 min. @ RT | 11 | 36 |
| -after 24 hr. @ RT | 21 | >48 |
| -after 2.4 hr @ RT | | |
| +5 hr @ −30° C. | 15 | >10* |
| +7 days @ 70° C. | 25 | >44 |
| +3 days in warm moisture | 22 | 32 |
| -after waxing compd. aging | 15 | 24 |
| -after dewaxing compd. aging | 18 | >50 |
| -after washing solution aging | 16 | 20 |
| -after alcohol aging | 15 | >27 |

*indicates that the foam tore apart

Example 2

This example is a comparison of the compression set of a foam that is chemically blown (by an excess of isocyanate and its reaction with moisture) and a foam that is made using expandable particulate (Expancel™).

Samples 3, 4 and 5 are made using the same process as is described in Example 1. Samples 1 and 2 were also made according to the process of Example 1 except for the omission of the polyetherdiol. The diisocyanate is mixed with the masterbatch in the Brabender. The film made under the press is put at 70° C., 100% humidity for 24 hours, for foaming and reticulation.

Sample 3 is the product according to the invention described in Example 1.

| Ingredient | | | | | | |
|---|---|---|---|---|---|---|
| Nature | Name | 1 | 2 | 3 | 4 | 5 |
| SBS Rubber | Vector 4111 | 100 | 100 | 100 | 100 | 100 |
| Tackifying Resin | Regalite R101 | 200 | 200 | 200 | 200 | 200 |
| CaCO₃ | Setacarb OG | 9 | 9 | 9 | 9 | 9 |
| Paraffinic Oil | Enerpat 10 | 30 | 30 | 30 | 30 | 30 |
| Polyetherdiol | Lupranol 2001 | — | — | 75 | 75 | 75 |
| Catalyst | Dabco T12 | 0.6 | 0.6 | — | — | — |

-continued

| Ingredient | | | | | | |
|---|---|---|---|---|---|---|
| Nature | Name | 1 | 2 | 3 | 4 | 5 |
| Catalyst | Texacat T30 | — | — | 5 | 5 | 5 |
| Diisocyanate | Lupranat MP130 | 80 | 40 | — | — | — |
| Diisocyanate | Vestanat TMDI | — | — | 8 | 8 | 8 |
| Plastic spheres | Expancel DU091 | — | — | 33 | — | — |
| Glass spheres | Atmospheres 150 um | — | — | — | 8 | — |

The compression set was determined using ASTM Standard Test Method D 1667-76, paragraphs 21 to 25. The following modification, however, was made to the test method. Instead of the test specimen being deflected 25% of its original thickness, the specimen is deflected to 50% of its original thickness.

Specific gravity: ASTM D1667-76 Force to compress: ASTM D1667-76, except the samples were compressed to 30% of their thickness, instead of 25%, at a speed of 10 mm/min.

| Property | Units | 1 | 2 | 3 | 4 | 5 |
|---|---|---|---|---|---|---|
| Specific gravity | Kg/m³ | 500 | 800 | 400 | 860 | 950 |
| % of theoretical density | % | 53 | 84 | 42 | 90 | 100 |
| Compression set | % | 61 | 35 | 11 | | 41 |
| Force to compress | N/cm² | | | 8.4 | 16.2 | 10.3 |

The specific gravity was measured using ASTM D1667-76 The force to compress was measured using ASTM D1667-76, except that the samples were compressed to 30% of their thickness rather than 25% at a speed of 10 mm/min.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A pressure sensitive adhesive foam having a density that is less than about 70% of the theoretical density, and consisting of a foamed adhesive polymer composition comprising:
   a) from about 5 to about 94% by weight of a composition selected from the group consisting of acrylate polymer, polyisobutylene, butyl rubber or silicone based pressure sensitive adhesive;
   b) from about 5 to about 70% by weight of a polymer comprising a polymer backbone selected from the group consisting of diene polymers and copolymers, olefin polymers and copolymers, polyesters, polyethers and mixtures thereof, wherein the polymer contains at least 2 active hydrogens available for reacting with an isocyanate;
   c) an isocyanate in an amount sufficient to give a ratio of isocyanate groups to active hydrogens in component b) of from about 0.25 to about 1.75; and
   d) an effective amount of an expandable particulate material comprising a polymeric shell and a volatilizable fluid core to yield a compression set under constant deflection of less than about 60 percent, and wherein the foam has an intrinsic adhesion of greater than about 1 N/cm.

2. A pressure sensitive adhesive foam according to claim 1 having a compression set under constant deflection of less than about 20%.

3. A pressure sensitive adhesive foam according to claim 1 having an intrinsic adhesion of greater than about 10 N/cm.

4. A pressure sensitive adhesive foam according to claim 1 having a density of less than about 50% of the theoretical density.

5. A pressure sensitive adhesive foam according to claim 1 having a density that is less than about 40% of the theoretical density, wherein the foam has an intrinsic adhesion of greater than about 20 N/cm and a compression set under constant deflection of less than about 10%.

6. A pressure sensitive adhesive foam comprising from about 99.5 to about 70% by weight of a pressure sensitive adhesive polymer composition having an intrinsic adhesion greater than about 10 N/cm and from about 0.5 to about 30% by weight of an expandable particulate material comprising a polymeric shell and a volatilizable fluid core, wherein the pressure sensitive adhesive polymer composition comprises:

a) from about 5 to about 94% by weight of a composition selected from the group consisting of acrylate polymer, polyisobutylene, butyl rubber and silicone based pressure sensitive adhesive;

b) from about 5 to about 70% by weight of a polymer comprising a polymer backbone selected from the group consisting of diene polymers and copolymers, olefin polymers and copolymers, polyesters, polyethers and mixtures thereof, wherein the polymer contains at least 2 active hydrogens available for reacting with an isocyanate;

c) an isocyanate in an amount sufficient to give a ratio of isocyanate groups to active hydrogens in component b) of from about 0.25 to about 1.75.

7. A pressure sensitive adhesive foam according to claim 6 in which the active-hydrogen containing polymer is selected from the group consisting of polyesterdiols, polybutadiene diols, polyetheramines, hydroxyl-grafted ethylene/vinyl alcohol polymers, poly-e-caprolactones and mixtures thereof.

8. A pressure sensitive adhesive foam according to claim 6 in which the isocyanate is tetramethylene di-isocyanate.

9. A pressure sensitive adhesive foam according to claim 6 in which the proportion of isocyanate groups to active hydrogen containing groups is from about 0.5 to about 1.5.

10. A pressure sensitive adhesive foam according to claim 6 in which the expandable particulate material comprises particles having a polymeric shell enclosing a volatilizable fluid material which is a liquid at room temperature.

11. A pressure sensitive adhesive foam having a density that is less than about 40% of the theoretical density, wherein the foam has an intrinsic adhesion of greater than about 20 N/cm and a compression set under constant deflection of less than about 20% and being formed from a composition comprising:

a) from about 10 to about 35% by weight of a thermoplastic block copolymer;

b) from about 30 to about 60% by weight of a tackifying resin;

c) from about 10 to about 25% by weight of a polymer comprising a polymer backbone selected from the group consisting of polybutadiene, polyesters and polyethers, wherein the polymer contains at least 2 active hydrogens available for reacting with an isocyanate;

d) an isocyanate in an amount sufficient to give a ratio of isocyanate groups to active hydrogens in component c) of from about 0.75 to about 1.25; and e) from about 0.5 to about 15% by weight of expandable particulate materials comprising a polymeric shell and a volatilizable liquid core.

12. A pressure sensitive adhesive foam according to claim 11 in which the thermoplastic block copolymer is a diene or olefin copolymer rubber.

13. A pressure sensitive adhesive foam according to claim 11 in which the tackifying resin is selected from the group consisting of rosins and rosin derivatives, hydrocarbon resins and terpene resins.

14. A pressure sensitive adhesive foam according to claim 13 in which the tackifying resin is a hydrocarbon resin selected from the group consisting of glycerine rosin ester, hydrogenated pentaerythritol ester, hydrogenated glycerine ester, modified tall oil rosin, polymerized rosin and rosin ester.

15. A pressure-sensitive adhesive foam according to claim 11 in which the active-hydrogen containing polymer is selected from the group consisting of polyesterdiols, polybutadiene diols, polyetheramines, hydroxyl-grafted ethylene/vinyl alcohol polymers, poly-e-caprolactones and mixtures thereof.

16. A pressure sensitive adhesive foam according to claim 11 in which the isocyanate is tetramethylene di-isocyanate.

17. A pressure sensitive adhesive foam according to claim 11 in which the expandable particulate material is added in an amount that is from about 5 to about 15% of the total weight components a) through d) of the pressure sensitive adhesive composition.

* * * * *